Dec. 18, 1945.    J. BUCKO    2,391,008
TORCH SUPPORTING ARM FOR OXY-ACETYLENE CUTTING MACHINES
Filed April 5, 1943
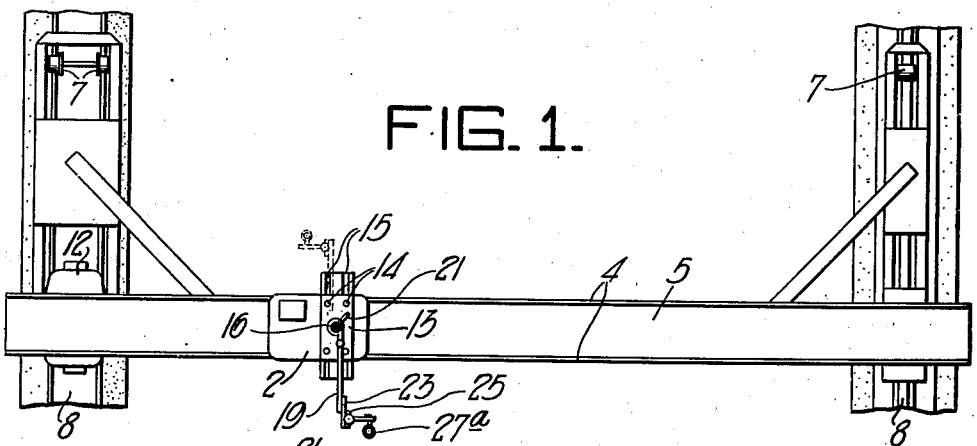
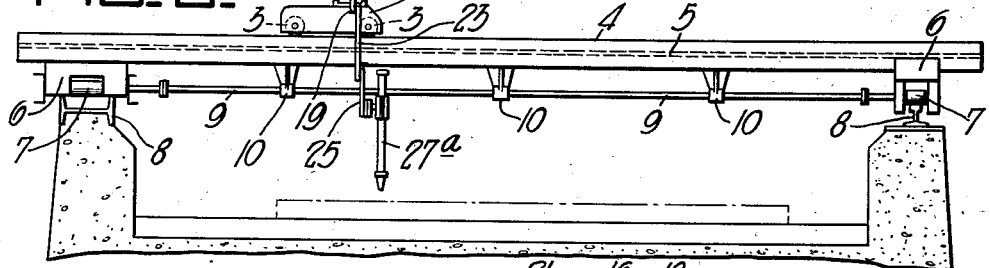
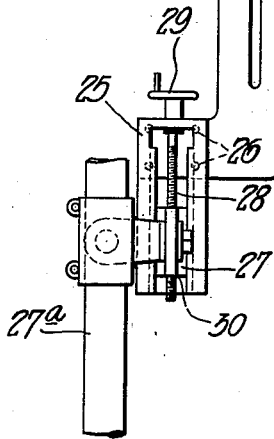
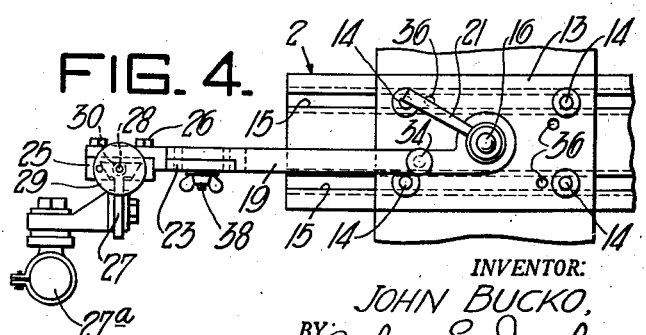
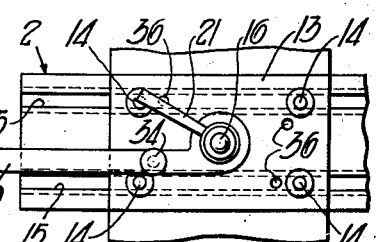
INVENTOR:
JOHN BUCKO,
BY John E. Jackson
HIS ATTORNEY.

Patented Dec. 18, 1945

2,391,008

UNITED STATES PATENT OFFICE 2,391,008

TORCH SUPPORTING ARM FOR OXYACETYLENE CUTTING MACHINES

John Bucko, Gary, Ind.

Application April 5, 1943, Serial No. 481,903

3 Claims. (Cl. 248—283)

This invention relates to oxy-acetylene cutting machines for cutting steel plates and the like, and particularly, to an improved arm for supporting the cutting torch thereon.

In the cutting of steel plates and the like, an oxygen-acetylene cutting machine is usually employed. Generally, such a machine has four wheels which travel along a track or beam for guiding the machine along the plate so as to insure that the cutting torch carried by the machine cuts the plate straight and evenly. Heretofore, in such a machine the cutting torch was usually carried by an outwardly extending arm securely mounted on top of the machine and the cutting torch was mounted on the outer end of this arm to one side of the machine. While there was usually provided a means for adjusting the cutting torch in both a horizontal and vertical plane, the cutting could be done only on that side of the machine to which the arms extended and on which side the cutting torch was disposed. In other words, the arm was secured in position and could not be changed without dismantling the machine. If it was desired to make a cut on the opposite side of the machine from that on which the cutting torch was disposed, it was necessary to turn the machine around so that the cutting torch was positioned on the opposite side of the cutting machine from that in the first instance. It was not only inconvenient and tedious to turn the machine around so that the arm and cutting torch were on the proper side thereof, but such procedure consumed considerable time and was hazardous to the operator.

Furthermore, the torch cutting arm as provided on such machines was usually of a light and flimsy construction. Such arms not only were frequently broken but they did not hold the cutting torch very rigid and an uneven cutting edge resulted. For these reasons, it will be seen that such an arm was quite unsatisfactory.

Accordingly, it is the general object of the present invention to provide an improved torch supporting arm for oxy-acetylene cutting machines wherein the foregoing disadvantages are eliminated.

It is among the objects of this invention to provide an improved torch supporting arm for oxy-acetylene cutting machines which is pivotally attached to the machine, and one which can be rotated through an angle of 360 degrees whereby the cutting torch may be adjusted to any desired cutting position to either side of the machine.

It is another object of the invention to provide an improved torch supporting arm for oxy-acetylene cutting machines having means arranged therewith for securely locking the arm against movement so that the cutting torch carried thereby can be securely disposed in any one of several angular positions on the machine.

It is a further object of the present invention to provide an improved torch cutting arm for oxy-acetylene cutting machines which is made in two parts whereby the actual cutting torch supporting means may be used with either one or both of the parts thereby making the machine with which it is used extremely more flexible in its use than machines equipped with arms heretofore suggested and used.

It is still another object of this invention to provide an improved torch supporting arm for oxy-acetylene cutting machines which is simple, rugged, and inexpensive in its construction and, at the same time, efficient and effective in its use.

Various other objects and advantages of this invention will be more apparent in the course of the following specification, and will be particularly pointed out in the appended claims.

In the accompanying drawing there is shown, for the purpose of illustration, one embodiment and a modification thereof which my invention may assume in practice.

In the drawing:

Figure 1 is a plan view of an oxy-acetylene cutting unit showing a cutting machine with which the improved torch supporting arm of my invention is incorporated;

Figure 2 is a front elevational view of the cutting unit as shown in Figure 1;

Figure 3 is an enlarged side elevational view of the improved torch supporting arm of my invention;

Figure 4 is a plan view thereof; and

Figure 5 is a view similar to Figure 3 showing a modified form of torch supporting arm in accordance with the present invention.

Referring more particularly to the drawing, there is shown in Figures 1 and 2 thereof, a conventional type oxygen-acetylene cutting machine 2 which consists generally of four wheels 3 arranged on the bottom thereof which are adapted to cooperate with the flanges 4 of an I-beam 5 for guiding the cutting machine along the plate to be cut which is arranged in a pit therebelow. In other words, the flanges 4 are adapted to act as a track for the wheels 3 of the cutting machine as the same is moved along. At either end of the I-beam 5, there is arranged on the lower side thereof, a bracket member 6 in which there is rotatably mounted a pair of rollers 7 which are disposed on rails 8 extending substantially perpendicular to the I-beam 5. In other words, the I-beam 5 together with the cutting machine 2 carried thereby, is mounted for movement on the rails 4 which cooperate with the rollers 7. There is arranged between at least one of the rollers 7 of each pair thereof, preferably a longitudinally extending shaft 9 which extends substantially parallel to the I-beam 5 and is journaled in a plurality of downwardly extending bracket members 10 mounted on the lower side thereof. One of the rails 8 consists preferably of an I-beam member and there is mounted on that end of the I-beam member 5, preferably a motor 12 which is suitably geared to the shaft 9 for rotating the same for moving the I-beam 5 together with the cutting machine 2 carried thereby along the rails 8.

According to the present invention, as shown in Figures 3 and 4 of the drawing, there is arranged on top of the cutting machine 2, a plate-like member 13 which is held in position thereon preferably by means of four bolts 14, with the heads thereof adapted to fit in a pair of inverted T-shaped slots 15 disposed in the top of the head of the cutting machine. Centrally of the plate 13, there is arranged an upwardly extending stud-like member 16 having a journal portion 17 arranged intermediate the length thereof, and a threaded portion 18 disposed on the upper end of the same. There is provided an outwardly extending arm 19 having a vertically disposed hole or bearing portion 20 arranged on the inner end thereof in which the journal portion 17 of the stud bolt 16 is disposed so as to provide a pivotal connection between the arm and the top of the cutting machine. On the upper end of the threaded portion 18 of the stud 16 above the hole in the arm 19, there is arranged a handle-like member 21 having a threaded portion 22 which is adapted to cooperate with the threaded portion 18 of the stud 16 so as to maintain the arm 19 in position on the stud 16, and to lock the same in its adjusted position thereon.

On the outer end of the arm 19, and extending substantially perpendicular thereto, there is arranged a downwardly extending arm-like member 23 which is attached thereto preferably by means of four removable bolts or cap screws 24. On the lower end of the arm-like member 23, there is arranged a torch holding member 25 which is attached thereto preferably by means of a plurality of removable bolts or cap screws 26 disposed in the same relation as the cap screws 24 for attaching the upper end of the arm-like member 23 to the outer end of the arm 19. There is carried by the torch holding member 25, a bracket-like member 27 for actually supporting the cutting torch 27ª and which is mounted for movement relative to the torch holding member 25. There is suitably journaled in the torch holding member 25, a vertically extending rotatable screw 28 having a handle 29 arranged on the upper end thereof.

There is arranged through the bracket member 27, an interiorly threaded hole 30 through which the screw 28 extends. In other words, the bracket member 27 which holds the cutting torch 27ª is adjusted vertically by rotating the screw 28 by means of the handle 29 through the cooperation of the threads on the screw and the threads in the hole 30 of the bracket member.

In the arm 19, at a point above the plate 13 adjacent the pivotal connection of the arm therewith, there is arranged a vertically disposed hole 31 in which there is positioned a pin 32 having a coil spring 33 arranged therearound. On the upper end of the pin 32 above the arm 19, there is arranged preferably a knurled thumb member 34 for manipulating the pin 32, and on the lower end of the pin 32, there is arranged preferably a semi-spherical portion 35 which is adapted to cooperate with any one of a plurality of holes 36 arranged in the top of the plate 13. One end of the spring 33 is adapted to about the shoulder arranged in the hole 31 and the opposite end thereof is adapted to abut the semi-spherical portion 35. In other words, the pin 32 is adapted to cooperate with any one of the holes 36 in the plate 13 to position the arm 19 angularly to either side of the cutting machine. If it is desired to change the angular position of the arm 19 or to rotate the arm so that the cutting torch 27ª is disposed on the opposite side of the cutting machine, the handle portion 21 on the stud 16 is manipulated so as to release the pressure thereof on top of the arm 19. The pin 32 is then pulled upwardly against the action of the spring 33 by means of the knurled member 34 so that the pin is withdrawn from the engagement with the hole 36 in which it is disposed. The arm 19 is then moved or rotated to the desired angular position or around to the opposite side of the machine and upon release of the pin 32, it will be seen that the semi-spherical portion 35 carried thereby will be forced into the hole 36 at the point of adjustment of the arm 19. After the arm 19 has been moved to the desired angular position, the handle member 21 is turned so as to tighten the same whereby the arm 19 is forced against the plate 13 and locked in its adjusted position.

If desired, the arm-like member 23 may be vertically slotted as at 37 and a thumb nut 38 provided for securing the same to the outer end of the arm 19. By providing such an arrangement, the arm-like member 23 may be adjusted vertically so that the torch can be adjusted to any desired elevation below the end of the arm 19. It will be understood that the thumb nut 38 is provided to hold the arm in its adjusted position. In such case the cap screws 24 are dispensed with unless the arm-like member 23 is disposed in its lower-most position, as shown in Figure 3 of the drawing.

If it is not desired to use the arm-like member 23, it can be removed from position on the end of the arm 19 by removing the cap screws 24, and the torch holding member 25 is then removed from the bottom of the arm-like member 23 by removing the cap screws 26. The torch holding member 25 is then assembled directly on the outer end of the arm 19 by replacing the cap screws 24 in the end of the arm, and the cap screws are tightened so that the torch holding member is securely mounted thereon. If desired, the arm 19, together with the arm-like portion 23, may be made integral with each other or in one piece, as shown in Figure 5 of the drawing.

As the result of my invention, it will be seen that the arm-like member 19, together with the cutting torch carried thereby, can be adjusted through an angle of 360 degrees, or in a complete circle. By such an arrangement, it will be seen that the cutting torch can be disposed either to one side or the other of the cutting machine 2, as desired, without disturbing or moving the cutting machine 2 or the beam 5, upon which it is movably mounted, or the plate being cut positioned therebelow. It will also be seen that by providing an arm which is adjustable angularly around the cutting machine, and one that is adjustable as to length for cutting slabs or plates of various thicknesses, that there is provided a torch cutting arm which is more flexible in its use than any arm heretofore suggested or used. Furthermore, it will be seen that the improved arm of my invention may be easily and conveniently incorporated with cutting machines now in use or with existing equipment without any material changes which is a decided advantage.

While I have shown and described a specific embodiment of my invention and a modification thereof, it will be understood that these embodiments are merely for the purpose of illustration and description and that various other forms may be devised within the scope of my invention, as defined in the appended claims.

I claim:

1. In an oxy-acetylene cutting machine of the class described having a rotatable member carried thereby for adjusting the cutting torch circularly in a horizontal plane, a downwardly extending member arranged on the outer end of said rotatable member, means for attaching selectively the upper end of the downwardly extending member securely to the outer end of the rotatable member, means arranged on the lower end of said downwardly extending member for supporting and holding the cutting torch, and identical means for attaching selectively the torch supporting means to the lower end of said downwardly extending member whereby the torch supporting means may be attached directly to the outer end of said rotatable member thereby dispensing with the use of said downwardly extending member.

2. In an oxy-acetylene cutting machine of the class described having a rotatable member carried thereby for adjusting the cutting torch circularly in a horizontal plane, a downwardly extending member arranged on the outer end of said rotatable member, said downwardly extending member having an elongated vertically extending slot arranged therein, a bolt arranged in the outer end of said rotatable member and extending through the slot of said downwardly extending member for attaching the same selectively to said rotatable member whereby the downwardly extending member may be adjusted vertically, and means arranged on the lower end of said downwardly extending member for supporting and holding the cutting torch.

3. The combination as defined in claim 2, including means for attaching selectively the upper end of the downwardly extending member securely to the outer end of the rotatable member, and identical means for attaching selectively the torch supporting means to the lower end of said downwardly extending member whereby the torch supporting means may be attached directly to the outer end of said rotatable member thereby dispensing with the use of said downwardly extending member.

JOHN BUCKO.